(12) United States Patent
Musgrove et al.

(10) Patent No.: US 7,627,486 B2
(45) Date of Patent: Dec. 1, 2009

(54) SYSTEM AND METHOD FOR RATING PLURAL PRODUCTS

(75) Inventors: Timothy A. Musgrove, Morgan Hill, CA (US); Robin Hiroko Walsh, San Francisco, CA (US); Russell Gilchrist, Ponce Inlet, FL (US)

(73) Assignee: CBS Interactive, Inc., County of New Castle, DE (US)

( * ) Notice: Subject to any disclaimer, the term of this patent is extended or adjusted under 35 U.S.C. 154(b) by 1418 days.

(21) Appl. No.: 10/265,189

(22) Filed: Oct. 7, 2002

(65) Prior Publication Data

US 2004/0068413 A1    Apr. 8, 2004

(51) Int. Cl.
*G06Q 30/00* (2006.01)

(52) U.S. Cl. .......................................................... 705/1
(58) Field of Classification Search ...................... 705/1
See application file for complete search history.

(56) References Cited

U.S. PATENT DOCUMENTS

| | | | |
|---|---|---|---|
| 4,996,642 A | 2/1991 | Hey | |
| 5,731,991 A | 3/1998 | Kinra et al. | |
| 5,911,131 A * | 6/1999 | Vig | 705/1 |
| 6,038,554 A * | 3/2000 | Vig | 705/400 |
| 6,115,691 A | 9/2000 | Ulwick | |
| 6,236,974 B1 | 5/2001 | Kolawa et al. | |
| 6,236,990 B1 | 5/2001 | Geller et al. | |
| 6,266,649 B1 | 7/2001 | Linden et al. | |
| 6,286,005 B1 | 9/2001 | Cannon | |
| 6,370,513 B1 | 4/2002 | Kolawa et al. | |
| 6,397,212 B1 | 5/2002 | Biffar | |
| 6,658,467 B1 * | 12/2003 | Rice et al. | 709/224 |
| 7,103,561 B1 * | 9/2006 | Sarkisian et al. | 705/10 |
| 7,124,116 B2 * | 10/2006 | Huyler | 705/400 |
| 7,373,303 B2 * | 5/2008 | Moore et al. | 705/1 |
| 2001/0044748 A1 | 11/2001 | Maier | |
| 2002/0040374 A1 | 4/2002 | Kent | |
| 2002/0116348 A1 * | 8/2002 | Phillips et al. | 705/400 |
| 2003/0065534 A1 * | 4/2003 | McCartney | 705/2 |
| 2003/0163349 A1 * | 8/2003 | Ho | 705/2 |
| 2003/0191723 A1 * | 10/2003 | Foretich et al. | 705/400 |

OTHER PUBLICATIONS

Tucker, Rufus S., "Concentration and Competition," Journal of Marketing, Apr. 1940, pp. 354-361.*

Coffey, Christopher C., Campbell, Donald L., and Zhuang, Ziqing, "Simulated Workplace Performance of N95 Respirators," American Industrial Hygiene Association Journal, Sep./Oct. 1999, pp. 618-624.*

* cited by examiner

*Primary Examiner*—Igor N Borissov
*Assistant Examiner*—Nathan Erb
(74) *Attorney, Agent, or Firm*—Marc S. Kaufman; Nixon Peabody, LLP

(57) ABSTRACT

A system and method for rating of each of plural products comprising identifying a plurality of attributes associated with a category of product, applying a scalar structure for each attribute to provide a scalar value for each attribute of each of the plural products, determining an incremental competitive index for each attribute of each product based on the scalar value of each attribute and a number of products having the scalar value, and rating each product based on the determined competitive index.

39 Claims, 3 Drawing Sheets

SYSTEM AND METHOD FOR RATING PLURAL PRODUCTS

BACKGROUND OF THE INVENTION

1. Field of the Invention

The present invention is directed to systems and methods for rating plural products. In particular, the present invention is directed to such systems and methods that allow rating of plural products based on their attributes.

2. Description of Related Art

Many different models of products from many different manufacturers are generally available for each type or category of product. Typically, manufacturers of a particular category of product offer various models in their product line, each model targeting a particular group of users and/or meeting the specific needs of a market segment. For instance, manufacturers of automobiles, vacuum cleaners, cameras, computers, etc. all generally manufacture a variety of models of their products. In many instances, each model from each manufacturer and models from differing manufacturers have different features and/or attributes associated with the particular category of product.

For example, in the product category of vacuum cleaners, various models having different combinations of features and/or attributes are presently available. These features and/or attributes for vacuum cleaners include bag/bagless operation, motor power, attachments, exhaust filtration, price, etc. One particular model of a vacuum cleaner may have a bag to collect debris, a 6 ampere motor, without attachments or exhaust filtration and be typically sold in the marketplace for $60 U.S. Another particular model of a vacuum cleaner may have a bagless compartment to collect debris, an 8 ampere motor, provided with attachments and a HEPA filtration, and be typically sold in the marketplace for $160 U.S. Of course, many other features and attributes may distinguish each of the vacuum cleaners that are available.

In another example, for the product category of digital cameras, features and/or attributes include optical and digital zoom capability, pixel count, the presence, type and size of a view screen, flash capacity, memory capacity, price, etc. One particular model of digital camera may have a 2× optical zoom, 2.1 megapixels, a flash, a 2 inch color view screen, a 32 Mb memory, and be typically sold in the market place for $200 U.S. Another particular model of digital camera may have a 3× digital zoom, 4 megapixels, a flash, a 3 inch color view screen, a 64 Mb memory and be typically sold in the market place for $400 U.S. Of course, many other features and attributes may distinguish each of the digital cameras that are available in the digital camera product category.

The vast number of manufacturers and models available for each product category, and the disparity in features and/or attributes between the products of a category can make a consumer's purchasing decision very difficult. Companies such as CNET Networks, Inc. (hereinafter "CNET") which operates www.cnet.com provide information regarding consumer and technology oriented products such as electronics and computer products for buyers, sellers, and suppliers of technology, as well as any other interested user. In addition to providing raw data and information, many different products in a particular product category are evaluated by editors of CNET for various features and/or attributes and rated on a scale of 1 through 10. Products that are evaluated to have higher quality and to provide superior value to consumers are rated higher than products of lesser quality and value. The information provided by CNET and others regarding various products of a product category may be used by consumers to facilitate potential purchase decisions. However, the process of rating the numerous products is time and labor intensive requiring trained individuals familiar with features and/or attributes of a product category to evaluate each of the products. In addition, as expected, this requirement significantly increases costs associated with providing such ratings. Further, such rating processes can be highly subjective.

Various automated systems have been developed to eliminate or substantially reduce the requirement for individual evaluation of each product. For instance, U.S. Pat. No. 5,731,991 to Kinra et al. discloses a system for evaluating a software product including an interface that receives product data relating to the software product, a first memory that stores the product data, and a second memory that stores a plurality of weighting values. The system also includes a processor that is coupled to the first memory and the second memory which applies the plurality of weighting values to the product data to generate at least one criterion score for the software product, each criterion score representing an evaluation of the software product.

U.S. Pat. No. 6,236,990 to Geller et al. discloses a system and method for assisting a user in selecting a product from multiple products that are grouped into categories. The reference discloses that information such as attributes about the products of each category, and questions related to the attributes, are received and stored. In addition, possible user's responses to the questions and weights associated with each possible response are also received and stored. Evaluation ratings for each of the attributes of each of the products are also received and stored. The reference discloses that the user selects a category and is provided with questions corresponding to the attributes of the products in the category selected. For each product in the category, a product score is calculated by summing the product of the weights of the responses by the evaluation ratings for that product. The results are displayed organized in rows and columns in the order of the product scores and weights. The reference further discloses that the user may change the weights, change categories, or obtain additional information about each product. In addition, the reference further discloses that the system allows attribution of the evaluation ratings, and may place an order for some or all products.

SUMMARY OF THE INVENTION

A first aspect of the present invention is a method for rating each of plural products comprising the steps of identifying plurality of attributes associated with a category of product, applying a scalar structure for each attribute to provide scalar value of each attribute for each of the plural products, determining an incremental competitive index for each attribute of each product based on the scalar value of each attribute and a number of products having the scalar value, and rating each product based on the determined competitive index.

A second aspect of the present invention is a method for rating plural products is provided comprising the steps of identifying plurality of attributes associated with a category of product, the plurality of attributes including price of each of the plural products, applying a scalar structure for each attribute to provide scalar value of each attribute for each of the plural products, and determining an incremental index for each attribute of each product based on the scalar value of each attribute. Price offset of each product based on an average price of the plural products in the category is determined and apportioned to one or more attribute associated with the category. The apportioned price offsets are correlated to increments of incremental index. A theoretical value price of each product is determined based on the correlated apportioned priced offsets, and the plural products are rated based on actual product price and the determined theoretical value price.

A third aspect of the present invention is a rating system for rating each of plural products is provided, the system comprising an identification module that stores plurality of attributes associated with a category of product, a quantification module adapted to apply a scalar structure for each attribute to provide scalar value of each attribute for each of the plural products, a competitive indexing module that determines an incremental competitive index for each attribute of each product based on the scalar value of each attribute and number of products having the scalar value, and a product rating module that rates each product based on the determined competitive index.

A fourth aspect of the present invention is a rating system for rating plural products is provided comprising an identification module that stores plurality of attributes associated with a category of product, the plurality of attributes including price of each of the plural products, a quantification module adapted to apply a scalar structure for each attribute to provide scalar value of each attribute for each of the plural products, and an indexing module that determines an incremental index for each attribute of each product based on the scalar value of each attribute. The system also includes a price offset module that determines price offset of each product based on an average price of the plural products in the category, and apportions the price offset of each product to one or more attribute associated with the category of product. A valuation module then determines a theoretical value price of each product based on the correlated apportioned priced offsets, and a product rating module that rates each product based on actual product price and the determined theoretical value price.

DETAILED DESCRIPTION OF THE PREFERRED EMBODIMENT

Conventional rating systems and methods possess various disadvantages that limit their utility and accuracy. In particular, the most commonly used rating method is based on percentile rank which is defined as the percentage of items in the data set which are below a value in question. Two problems arise with the use of percentile rank in rating products of a product category.

Firstly, by definition, the average percentile rank is not guaranteed to be 0.50. In fact, the average percentile rank actually moves around as the data changes. This makes it difficult to generate a balanced index from percentile-ranked values that rates products accurately relative to other products in a product category without continual re-normalization of the index.

Secondly, percentile rank does not provide an accurate determination of top and bottom index values indicative of the feature and/or attribute in situations where the number of possible values is small, for instance, when the index values range merely from 0 to 1 or 0 to 3. In this regard, the percentile rank methods assign zero for the bottom index value, regardless of how common or how rare it is for an item to have such a feature and/or attribute corresponding to the index value. Referring to the example noted previously, if nearly all digital cameras in the market lack a certain attribute and/or feature, a zero percentile rank is assigned to these products with respect to the certain attribute and/or feature that is missing. Likewise, if most digital cameras have a particular attribute and/or feature, and only one camera lacks that feature, a zero percentile rank is assigned to this product.

Thus, conventional methods for rating products which utilize percentile rank do not differentiate between features and/or attributes which are present or missing from a large majority of products from features and/or attributes which are present or missing from a small minority of products. However, lacking a feature which nearly all competitors have, is usually perceived by consumers as being significantly worse than lacking a feature which is hard to find. Therefore, a significant disadvantage of conventional systems and methods for rating products is that they do not rate or rank products while taking into consideration the actual number of products in a product category that have, or do not have, a particular feature and/or attribute.

The preferred embodiment described below facilitates rating plural products without the disadvantages of conventional methods and systems for rating. The preferred embodiment facilitates rating plural products while taking into consideration the actual number of products in a product category that have, or do not have, a particular feature and/or attribute. In the preferred embodiment, the average index can be 0.50 without re-normalization of the index.

Figure 1:
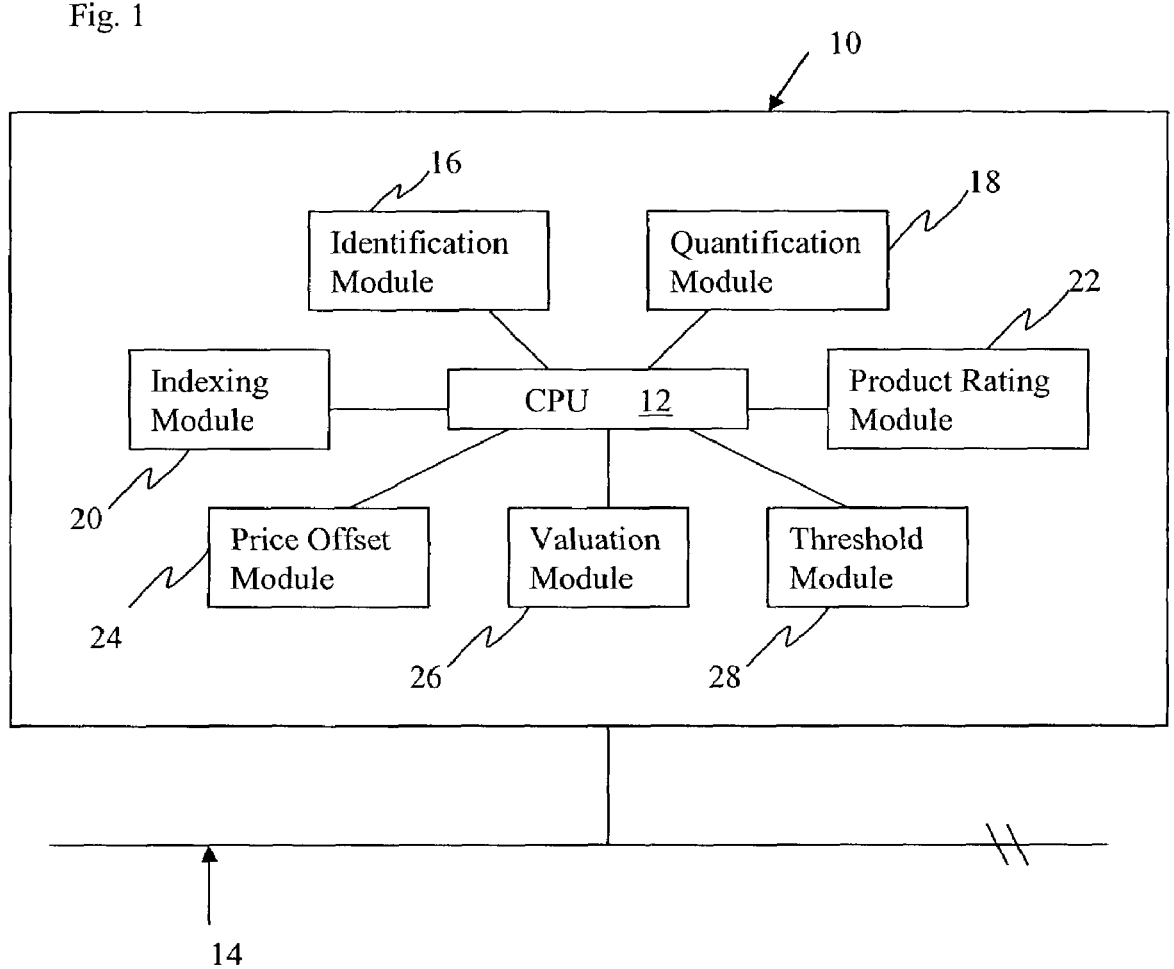
FIG. 1 is a schematic illustration of a system for rating plural products in accordance with one embodiment of the present invention.

FIG. 1 is a schematic illustration of a rating system 10 for rating plural products in accordance with one embodiment of the present invention. Whereas the present invention may be applied using the conventional percentile rank, it will be evident from the discussion below that the preferred embodiment of the present invention provides a rating system which takes into consideration the actual number of products in a product category that have, or do not have, a particular feature and/or attribute. For clarity purposes, the present invention is also described below as applied to rating digital cameras. However, it should be evident that the present invention may be readily used to rate any products of any other product category, and rating of digital cameras is merely provided as one example.

In accordance with the illustrated embodiment of the present invention, the rating system 10 is provided with a central processing unit 12 (hereinafter "CPU") which is adapted to control and/or facilitate functions of various modules of the rating system 10 as described in detail below. It should be initially noted that the rating system 10 of FIG. 1 may be implemented with any type of hardware and software, and may be a pre-programmed general purpose computing device. For example, the rating system 10 may be implemented using a personal computer, a portable computer, a thin client, a hand held device, a wireless phone, or any combination of such devices. The rating system 10 may be a single device at a single location or multiple devices at a single, or multiple, locations that are connected together using any appropriate communication protocols over any communication medium such as electric cable, fiber optic cable, any other cable, or in a wireless manner using radio frequency, infrared, or other technologies.

It should also be noted that the rating system 10 in accordance with one embodiment of the present invention is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented and substantially perform the particular functions explained. Moreover, two or more of these modules may be combined together within the rating system 10, or divided into more modules based on the particular function desired. Thus, the present invention as schematically embodied in FIG. 1 should not be construed to limit the rating system 10 of the present invention.

In the illustrated embodiment, the rating system 10 is connected to a network 14 that allows publishing and remote access to the rating system 10. The network 14 may be any type of communications channel, such as the Internet, a local area network (LAN), a wide area network (WAN), direct computer connections, and may be accomplished in a wireless manner using radio frequency, infrared, or other technologies, using any type of communication hardware and protocols. The specific details of the above devices and technology referenced are well known in the art and thus omitted herein.

The rating system 10 includes an identification module 16 that stores plurality of attributes associated with a category of product. The "attributes" as used and referred to herein collectively refer to particular features and/or characteristics of a product or product category. For instance, as previously described, attributes for a digital camera category may include optical and digital zoom, pixel size, presence and size of a view screen, flash capacity, memory capacity, price, etc. In one embodiment of the present invention, an automated crawler or search engine may be used to gather the attributes for a product category as well as the attributes of each product. Of course, such information may also be gathered manually. The identification module 16 then stores the gathered attributes for a product category and the attributes of each product in a database or other storage device (not shown). Preferably, the plurality of attributes that is used to rate the products of a given category includes the price of each of the plural products. In addition, other pertinent data may be gathered and stored by the identification module such as merchants that are selling the product.

The rating system 10 also includes a quantification module 18 that is adapted to apply a scalar structure for each attribute to provide a scalar value of each attribute for each of the plural products. In other words, scalar variables are applied to quantify the attribute of each product so that the information stored in the identification module 16 may be processed. For example, whether a digital camera is provided with a view screen or not, and the type and size of the view screen, if provided, should all preferably be numerically represented.

Numerous types of scalar structures may be used. For example, a boolean structure may be used where False=0 and True=1. Alternatively, an extended boolean structure may be used where False=0, Optional=1, and Included=2. In still another alternative, a discrete structure may be used. In the example of digital cameras, the attribute of a view screen may be provided with scalar values where NoScreen=0, LCD=1, BackLitLCD=2, ColorLCD=3, etc. Of course, these structures are merely provided as examples of how a scalar structure for each attribute may be applied to provide a scalar value of each attribute for each of the plural products. In addition, other attributes of a product category may be already numeric so that the numeric values of the attributes may be utilized directly. For example, the number of pixels of a digital camera is described as a numeral such as 2.1 megapixels, which may be directly used instead of applying a particular scalar structure thereto. It should also be noted that such numeric attributes should be normalized so that same units of measure are used, for instances, the size of the view screen for all digital cameras should be in the same units, such as inches.

The rating system 10 in accordance with the illustrated embodiment also includes an indexing module 20 that determines an incremental index for each attribute of each product, based on the scalar value of each attribute, as applied by the quantification module 18 discussed above. Although the incremental index may be a percentile rank, the incremental index is preferably a competitive index which compensates for the number of products in a product category that have the particular scalar value (which represents a particular attribute). In the present embodiment, the indexing module 20 determines the incremental index for each attribute by calculating a percentile rank of each scalar value. Then, the indexing module 20 calculates the percentile rank range which each scalar value spans. The indexing module 20 then processes a maximum percentile rank and a minimum percentile rank of the calculated percentile rank range. In accordance with one embodiment, the indexing module 20 processes the maximum percentile rank and the minimum percentile rank by calculating an average of the maximum and the minimum percentile rank. Alternatively, or in addition thereto, the competitive indexing module 20 may also sequence the scalar value of each attribute for each of the plural products.

The above described "competitive index" is further explained by the example of TABLE 1 discussed below which illustrates how the indexing module 20 determines the incremental index, which in this particular example, is the competitive index. As previously noted, whereas conventional percentile rank may be used as the index, the competitive index is preferably used which provides significant advantages over the conventional percentile rank as will be evident in view of the example of TABLE 1, as well as the examples set forth in TABLE 2, and TABLE 3 described in detail below.

In the example of TABLE 1, the scalar structure is applied for each attribute for each of the plural products by the quantification module 18. In particular, the scalar values may have a discrete structure representing the presence and type of view screen in a digital camera where NoScreen=0, LCD=1, BackLitLCD=2, and ColorLCD=3. In the example below, the scalar value of each attribute for each of the plural products have been sequenced from high value 3 to low value 0. Moreover, TABLE 1 further shows in the column marked "Percentile Rank", the corresponding percentile rank that is used to calculate the competitive index. The percentile rank may be calculated in a conventional manner for the corresponding scalar values.

TABLE 1

| Comparison of Percentile and Competitive Index | View Screen Scalar Values Sequenced from high to low (10 total) | Percentile Rank | Competitive Index |
| --- | --- | --- | --- |
|  | 3 | 0.9 | 0.95 |
|  | 2 | 0.7 | 0.8 |
|  | 2 | 0.7 | 0.8 |
|  | 1 | 0.3 | 0.5 |
|  | 1 | 0.3 | 0.5 |
|  | 1 | 0.3 | 0.5 |
|  | 1 | 0.3 | 0.5 |
|  | 0 | 0 | 0.15 |
|  | 0 | 0 | 0.15 |
|  | 0 | 0 | 0.15 |
| Average | 1.1 | 0.35 | 0.5 |

As previously described, the most commonly used rating method is based on percentile rank which does not ensure that the average percentile rank is 0.50 thereby requiring continual re-normalization of the index to provide accurate rating of a product relative to other products in a product category. In addition, as evident from examination of the calculated percentile rank values, the conventional percentile rank method assigns zeroes for the bottom index value despite the fact that three of the products, or full 30% of the products, do not have this attribute (i.e., in this example, has a scalar value of zero). Thus, conventional methods for rating products do not compensate for the number of products that have, or do not have, a particular attribute and thus do not reflect market realities.

In contrast, the competitive index as implemented in the present embodiment compensates for the number of products that have, or do not have, a particular attribute. The competitive index is calculated in the present embodiment by the indexing module 20 which determines the percentile rank range which each scalar value spans. For instance, in the example of Table 1, the scalar value "0" spans a 0-30 percentile rank range, the scalar value "1" spans a 30-70 percentile rank range, the scalar value "2" spans a 70-90 percentile rank range, and lastly, the scalar value "3" spans a 90-100 percentile rank range.

In accordance with the illustrated embodiment, the indexing module 20 then processes the maximum percentile rank and a minimum percentile rank of the percentile rank ranges. In this regard, the indexing module 20 processes the maximum percentile rank and the minimum percentile rank by calculating an average of the numerical maximum percentile rank and the numerical minimum percentile rank. Thus, in the present example of TABLE 1, the corresponding competitive indexes are calculated as follows. With respect to the scalar value "0", the numerical value of minimum percentile rank of 0 and the maximum percentile rank of 0.30 are averaged together to provide 0.15 as the competitive index. For the scalar value "1", the numerical value of minimum percentile rank of 0.30 and the maximum percentile rank of 0.70 are averaged together to provide 0.50 as the competitive index. For scalar value "2", the numerical value of minimum percentile rank of 0.70 and the maximum percentile rank of 0.90 are averaged together to provide 0.80 as the competitive index. With respect to the scalar value "3", the numerical value of minimum percentile rank of 0.90 and the maximum percentile rank of 1.00 are averaged together to provide 0.95 as the competitive index.

The competitive index calculated in the manner described for the above example maintains the average competitive index at 0.50 so that a product having a competitive index value above 0.50 for a particular attribute represents better-than-average product for that attribute, and a product having a competitive index values below 0.50 for another particular attribute represents worse-than-average product for that particular attribute. It should be evident that the competitive index calculated in the above described manner compensates for the actual number of products in the product category that has, or does not have, a particular attribute. For instance, in the present example, if 6 products (out of 10) have the "0" scalar value instead of 3, the competitive index would change from 0.15 to 0.30. Of course, it should also be noted that the competitive index may be calculated in a different manner as long as the calculated competitive index compensates for the actual number of products in the product category that has, or does not have, a particular attribute.

As previously noted, whereas the present invention may be implemented using the conventional percentile rank, the above example illustrates the advantages of using the competitive index for the preferred implementation. The above noted characteristics of the competitive index in accordance with one embodiment of the present invention and its distinction when compared to percentage rank are further highlighted in TABLE 2 shown below.

TABLE 2

| Value Set A | | | Value Set B | | |
|---|---|---|---|---|---|
| Scalar Value | Percentile Rank | Competitive Index | Scalar Value | Percentile Rank | Competitive Index |
| 1 | 0.80 | 0.90 | 1 | 0.20 | 0.60 |
| 1 | 0.80 | 0.90 | 1 | 0.20 | 0.60 |
| 0 | 0.00 | 0.40 | 1 | 0.20 | 0.60 |
| 0 | 0.00 | 0.40 | 1 | 0.20 | 0.60 |
| 0 | 0.00 | 0.40 | 1 | 0.20 | 0.60 |
| 0 | 0.00 | 0.40 | 1 | 0.20 | 0.60 |
| 0 | 0.00 | 0.40 | 1 | 0.20 | 0.60 |
| 0 | 0.00 | 0.40 | 1 | 0.20 | 0.60 |
| 0 | 0.00 | 0.40 | 0 | 0.00 | 0.10 |
| 0 | 0.00 | 0.40 | 0 | 0.00 | 0.10 |

Table 2 shows two sets of values, "Value Set A", and "Value Set B" that set forth scalar values of ten products for a particular attribute of the product's category in columns indicated "Scalar Value", and their corresponding percentile rank and calculated competitive index in columns indicated "Percentile Rank" and "Competitive Index", respectively. As shown, in both value sets, the scalar values were intentionally chosen to span a very narrow range, i.e. between 0 and 1. In addition, the majority of products in Value Set A have the scalar value of 0 while the majority of products in Value Set B have the scalar value of 1 to show how the competitive index compensates for the distribution of the scalar values. In particular, eight of the products have the scalar value of 0 and two of the products have the scalar value of 1 in Value Set A, whereas only two of the products have the scalar value of 0 and eight of the products have the scalar value of 1 in Value Set B.

From carefully reviewing TABLE 2, it can be seen that for scalar value of 1 in Value Set A, the competitive index calculated in the manner described above is nearly the same as the conventional percentile rank. For the products having the scalar value of 1, the competitive index is 0.90 while the percentile rank is 0.80. However, the competitive index is significantly higher for products lacking that particular attribute, i.e. having a scalar value of 0, as compared to the conventional percentile rank. In particular, the percentile rank is 0 for the products that have a scalar value of 0 thereby inaccurately giving the impression that these products are at the very bottom of all the products with respect to the particular attribute, when in fact, these products are average or typical. In contrast, the competitive index for these products is 0.40 which is slightly below the average value of 0.50 which more accurately reflects the fact that most items in this particular category, in this example, 8 out of 10 products, lack that attribute.

In the quite different example set forth in Value Set B where it is common for most products to have a scalar value of 1 for the particular attribute, the conventional percentile rank is merely 0.20 which again, inaccurately gives the impression that products having the scalar value of 1 are at the bottom of all the products with respect to the particular attribute. In contrast, the competitive index calculated in the manner previously described for these products is 0.60 which is slightly above the average of 0.50. This more accurately reflects the fact that most items in this particular category, in this example, 8 out of 10 products, have that attribute.

The disadvantage of conventional percentile rank is also clearly evident by comparing the percentile rank of products having scalar value of 0 in Value Set A with those of Value Set B. As shown, conventional percentile rank treats these products with the scalar value of 0 the same in both value sets regardless of the fact that most of the other products do not have a particular Value Set A, while most of the other products have a particular attribute in Value Set B described above, this does not correspond with how consumers are likely to evaluate the products in the market. In contrast, as also described above, the competitive index compensates for the number of products in a product category that have the particular scalar value and better corresponds with how consumers are likely to evaluate the products.

Furthermore, the competitive index also takes into consideration the fact that some increments of scalar value of a particular attribute may be more meaningful to consumers than other increments. This characteristic of competitive index is illustrated and described in further detail relative to TABLE 3 below.

TABLE 3

| Scalar Value for Resolution (Megapixels) | Competitive index |
|---|---|
| 6 | 0.95 |
| 5 | 0.85 |
| 3 | 0.70 |
| 3 | 0.70 |
| 2 | 0.35 |
| 2 | 0.35 |
| 2 | 0.35 |
| 2 | 0.35 |
| 2 | 0.35 |
| 1 | 0.05 |

Table 3 tabulates the attribute of resolution in digital cameras, i.e. the number of pixels. In the present example, each of the scalar values correspond directly to the number of megapixels of the digital camera. Thus, the scalar value of 1 corresponds directly to a digital camera featuring 1 megapixels, the scalar value of 2 corresponds directly to a digital camera featuring 2 megapixels, and so forth with the scalar value of 6 corresponds directly to a digital camera featuring 6 megapixels. Of course, in actuality, various digital cameras may feature different number of megapixels, such as 1.2 megapixels, 2.1 megapixels, etc. However, for the purpose of this example, these values can be rounded to provide whole increments for the scalar value.

It is well known in the digital camera market that with all other attributes the same, the difference in value to a consumer between a digital camera featuring 2 megapixels versus 1 megapixels is far greater than the difference in value between a digital camera featuring 6 megapixels versus 5 megapixels. Stated in another manner, the quality of pictures captured by a digital camera featuring 2 megapixels is significantly better than those captured by a digital camera featuring 1 megapixels. However, the quality of pictures captured by a digital camera featuring 6 megapixels is only very marginally better than those captured by a digital camera featuring 5 megapixels. This is merely the concept of diminishing returns taking effect where each incremental increase in the scalar value, i.e. the incremental increase in megapixels resolution, adds value to the digital camera, but this value is added in decreasing amounts.

The above described non-linearity in value of the product versus the incremental increase in the scalar value is clearly reflected in the calculated competitive rank which shows that the difference between the competitive indexes of a digital camera featuring 6 megapixels versus 5 megapixels is significantly less than the difference between the competitive indexes of a digital camera featuring 2 megapixels versus 1 megapixels. As indicated in TABLE 3, the competitive index of a digital camera featuring 6 megapixels is 0.95 while the competitive index of a digital camera featuring 5 megapixels is 0.85 thereby, indicating a difference in competitive index of 0.1. In contrast, the competitive index of a digital camera featuring 2 megapixels is 0.35 while the competitive index of a digital camera featuring 1 megapixels is 0.05 thereby indicating a difference in competitive index of 0.3 which is significantly greater than 0.1. Thus, although in both cases, the differences between the digital cameras were 1 megapixels, the corresponding difference in the competitive index were not the same. In fact, a 200% greater impact is realized in incrementally increasing resolution to 2 megapixels from 1 megapixels, as compared to incrementally increasing resolution to 6 megapixels from 5 megapixels.

Therefore, in view of the examples as set forth in TABLE 1, TABLE 2, and TABLE 3 described in detail above, it should now be evident that the competitive index compensates for the number of products in a product category that have the particular scalar value. It should also be evident that the competitive index better corresponds with how consumers are likely to evaluate the products as compared to the conventional percentile rank. Thus, whereas the present invention may be implemented utilizing percentile rank, it is preferably implemented utilizing competitive index instead.

It should also be noted that very precise and well distributed scalar values should de-granularized, for instance by rounding, to avoid having the percentile ranges be very narrow which would result in misleading competitive indexes. Potential for such errors can be seen in TABLE 4 discussed below.

TABLE 4

| Scalar Value | Competitive Index | Rounded Scalar Value | Competitive Index |
|---|---|---|---|
| 7.121 | 0.95 | 7.1 | 0.95 |
| 6.879 | 0.85 | 6.9 | 0.85 |
| 5.432 | 0.75 | 5.4 | 0.75 |
| 5.129 | 0.65 | 5.1 | 0.65 |
| 4.675 | 0.55 | 4.7 | 0.55 |
| 3.419 | 0.40 | 3.4 | 0.25 |
| 3.419 | 0.40 | 3.4 | 0.25 |
| 3.418 | 0.25 | 3.4 | 0.25 |
| 3.417 | 0.15 | 3.4 | 0.25 |
| 3.412 | 0.05 | 3.4 | 0.25 |

In the first column of TABLE 4, scalar values corresponding to attributes of products are listed. As shown, many of the scalar values toward the bottom of the list are substantially the same (i.e., 3.419, 3.418, etc.) and their numeric differences in their scalar values is not significant in actual products. However, as shown in the second column, corresponding competitive index calculated using these scalar values show that these scalar values toward the bottom of the list are given substantially different competitive indexes which range from 0.40 to 0.05. This is due to the fact that the scale is too granular with percentile ranges being very narrow. Such disparity in the competitive indexes based on minute differences in the scalar value is misleading, because as a practical matter, the scalar values are substantially the same. To prevent such erroneous calculation of competitive indexes, the scalar values are de-granularized, for instance by rounding, as shown in the third column of TABLE 4. The corresponding competitive index calculated using these rounded scalar values of the third column of TABLE 4 show that the scalar values toward the bottom of the list are given the same competitive index of 0.25 which more accurately represents the fact that these products are substantially the same with respect to this particular attribute. In the above manner, the rating system 10 in accordance with the present embodiment, may be adapted to automatically round the scalar values to ensure that the percentile ranges are reasonable in size.

In accordance with one embodiment of the present invention, the rating system 10 includes a product rating module 22 that rates each product based on the determined competitive index. For instance, the rating system 10 may rate the plural products of a product category based on one or more attributes which may be requested by a consumer, an editor, an administrator, or any other user, collectively referred to herein as users. In other words, the attributes to be considered by the rating system 10 may be determined by the user of the system. Alternatively, or in addition, the user may be allowed apply a weighting to the importance of one or more of the attributes upon which the rating is based. For instance, the user may be allowed to designate that the rating of digital camera should be based on the number of pixels and the type of view screen provided, the number of pixels being weighted at 70% of the rating and the type of view screen being less important and weighted at 30%.

Alternatively, the user may be allowed to select a limited number of typical use scenarios which weigh the importance levels of each attribute differently. For instance, referring again to the digital camera example, a selection by the user indicating "outdoor sightseeing photography" scenario would raise the importance level of "zoom" attribute and re-rank the products accordingly. Thus, in the above described manner, the product rating module 22 may be adapted to rate the plural products based on the competitive index and the input from the user. Of course, the present invention is especially valuable to consumers in assisting a purchase decision. Consequently, whereas the discussions below refer to a consumer, it should also be understood that an editor, an administrator, or any other user are implicitly referred to as well.

In accordance with one preferred embodiment of the present invention, the product rating module 22 of the rating system 10 is further adapted to rate the products of a product category based on value the products offer to the consumer. As previously noted, the plurality of attributes that is used to rate the products of a category preferably includes the price of each of the plural products. This attribute of price allows the products to be rated based on the value each product offers to the consumers. For example, the digital cameras may be ranked based on the number of pixels provided relative to the camera's price.

If a price of a product is not available for some reason, an estimated street price may be manually provided to the rating system 10. Since new products debut with very few, or no, actual prices available, the anticipated street price may be provided to the rating system 10. This ability to manually provide prices allows determination of the competitive index as well as the value index in the manner discussed below for new products as well. Of course, as actual prices become available for the particular product, the actual prices can be used instead of the estimated street price or the anticipated street price. In this regard, actual prices may be used in conjunction with the estimated street price or the anticipated street price by averaging them together, at least until a predetermined number of actual prices are available for use. For example, if an anticipated street price is initially set at $500, and then the first merchant price comes in at $600, then both prices are used by averaging them together to derive an "estimated street price" of $550. However when more than a predetermined number of merchant prices are found, for instance, three merchants, the anticipated street price is no longer used and the actual prices can be used instead. If, in this example, all three merchants priced the product at $600, the price used is $600.

In accordance with the illustrated embodiment, the rating system 10 further includes a price offset module 24 that determines price offset of each product based on an average price of the plural products in the category. The price offset module 24 also apportions the price offset of each product to one or more attribute associated with the category of product. Once the price offsets are determined and apportioned to the attribute(s), attribute-based price-differentials for each product are effectively derived. In addition, to prevent skewing of the average price data, a predetermined number of the highest and/or the lowest prices of each product may be discarded in determining the average price if the highest and/or the lowest prices are more than a certain number of standard deviations away from the average.

Referring again to the digital camera example, if a digital camera costs $120 dollars more than the average cost for a digital camera, the $120 premium may be apportioned to various attributes of the digital camera that are above average in terms of the competitive index. In this example, the digital camera may have competitive index of 0.7 for the attribute of the number of pixels, and a competitive index of 0.6 for the attribute of the type of view screen provided. In other words, the digital camera has a competitive index 0.2 above average (i.e. 0.7−0.5=0.2) for the number of pixels, and has a competitive index 0.1 above average (i.e. 0.6−0.5=0.1) for the type of view screen. The price offset may be apportioned between these two attributes proportionately. In particular, $80 of the price offset (i.e. ⅔ of $120) may be apportioned to the attribute of number of pixels, while $40 of the price offset (i.e. ⅓ of $120) may be apportioned to the attribute of the type of view screen. In addition, it should be noted that price offset may be a negative number as well for those products that cost less than the average cost. Such negative price offsets may be apportioned in a similar manner. Again, these numbers and attributes are provided as examples only and different number of attributes may be used in the example of the digital camera, and other attributes used for other product categories.

In addition, the price offset module 24 may also be used to correlate the apportioned price offsets to increments of the competitive index. The correlation of the price offsets to increments of the competitive index may be attained by distributing the price offset in proportion to the difference in (i.e. increments of) the competitive index. In other words, once the price offsets are determined for each product and apportioned, they are averaged together across all products for each attribute. This effectively yields the average unit of price-per-increment of competitive index for each attribute. For example, each 0.01 increment of competitive index for the attribute of number of pixels in a digital camera may be worth $12.80. Stated in another manner, if a digital camera is better than average (above 0.50) in its number of pixel competitive index, it will be worth an additional $12.80 for every 0.01 competitive index that is above 0.50. If a digital camera is worse than average (below 0.50) in its number of pixel competitive index, it will be worth $12.80 less for every 0.01 competitive index that is below 0.50. Of course, the above described example is merely provided for clarity. In addition, in other embodiments, the correlation may be made in another manner and the price offset need not be proportional to the difference in the increment of the competitive index. In this regard, a non-linear correlation may be made.

In accordance with the illustrated embodiment, the rating system 10 further includes a valuation module 26 that determines a theoretical value price of each product based on the correlated apportioned priced offsets as determined by the price offset module 24 described above. As referred to herein, the "theoretical value price" is the theoretical monetary value (e.g. in the U.S., the dollar value) of the product based on its attributes. Because the unit of price-per-increment of competitive index for each attribute is known, a theoretical value price for each product of a product category may be calculated. In the present example, by correlating the apportioned price offsets to each increment of competitive index for each attribute of the digital camera using the method described above, a theoretical value price of each digital camera can be determined by the rating system 10.

In one embodiment, the theoretical value price of each product may be determined by adding the apportioned price offsets for each of the attributes of a product to the average price of all digital cameras. In other words, in the example of digital cameras, the prices corresponding to each attribute for each of the digital cameras is determined using the competitive index and the correlated apportioned price offsets, i.e. the unit of price-per-increment of competitive index. The prices offsets corresponding to all of the attributes of a digital camera are added to the average price of all the digital cameras. In this regard, it should be remembered that the price offsets corresponding to each attribute of a particular product may be a negative value if the attribute of a particular product has a competitive index below 0.5, the negative value reducing the theoretical value price. Again, in the present example of digital cameras, such attributes may include optical and digital zoom, pixel size, presence, type and size of a view screen, flash capacity, memory capacity, etc. The final sum attained by adding all the price offsets associated with each attribute for each of the digital cameras to the average price of digital cameras provides the theoretical value price for each of the digital cameras price which is the price the digital product should be worth in the market, i.e. its fair market value. Of course, this theoretical value price may be higher or lower than the actual street price of the product.

The product rating module 22 may then be used to rate each of the plural products based on the product's street price and its theoretical value price as determined by the valuation module 26 in the manner described above. A value index may be assigned based on the ratio or other function of the calculated theoretical value price and the actual street price to thereby rate the value of the product. The value index may be derived by spreading any differential between the value price and the street price across a scale, such as a 1-10 scale. For example, for an exact match of the theoretical value price and the actual street price, a value index of 5.0 may be used. If the theoretical value price is higher than the actual street price, this would indicate that the particular product provides better value to customers and may be assigned a higher value index such as 7.0, etc. Of course, any appropriate method may be used to provide a scale based on the actual product price and the theoretical value price as determined by the valuation module 26. In addition, the rating of the plural products based on the value index may be sequenced in descending or ascending order to facilitate review of the product ratings.

As previously noted, the rating system 10 in the illustrated embodiment may be implemented using a computational device such as a server and is connected to network 14, for instance, the Internet. This allows the determined competitive index, the value index, and/or the sequenced product ratings to be published so that consumers can remotely access the rating system 10 and obtain the published information. In addition, such implementation of the rating system 10 allows the above described process for rating plural products to be periodically or continually repeated to ensure timeliness and accuracy of the ratings provided by the rating system. In this regard, a script, i.e., a job that runs nightly, weekly, etc., may be used together with a mechanism (not shown) supplied to control its schedule. In addition, such repetition of rating the plural products may also be made on an on-demand basis. Moreover, the previous valid rating of a particular product may be stored and used if, for some reason, a new rating cannot be determined.

Additional features and functions may also be provided in the rating system 10 in accordance with various embodiments of the present invention. For instance, the product rating module 22 of the illustrated embodiment may be further adapted to monitor the ratings of each product. If the rating of a particular product changes at least a predetermined amount, for instance, changes by a 2.5 value index, the product rating module 22 may be adapted to generate a notification of such a change to an administrator and/or consumer(s). The notification may be an e-mail message distributed to members of a subscriber list. Alternatively or in addition thereto, a report may be sent every time the value index is recalculated and published, the report identifying products in which the value index has changed, the previous value index and the new value index for those products, and the amount of change. The report may also group the products by major category and sort the products by descending order of the amount of change. Such dissemination of changes to the value index may be very valuable to consumers that are interested in particular products or particular category of products since dramatic change in the value index indicates a major price change that can suddenly make a particular product an outstanding value.

To protect against publishing erroneous ratings, the rating module 22 may withhold publication of the ratings if more than a predetermined percentage of products in a particular product category have their value indexes change by more then a predetermined percentage. This protects against corrupt data feeds which may occur, for example, if a merchant maintains a price list where all the prices were corrupted. In such an instance, the rating system 10 may be adapted to withhold publication of the ratings and send an alert to the administrator so that the changes in the value indexes may be validated.

In addition, the rating module 22 of the rating system 10 may optionally be adapted to generate a product diagnostic report which shows various additional detailed information revealing the details of the competitive index, value index and/or rating for any product according to a desired search criteria. In this regard, data visualizations and graphs may be generated to facilitate comprehension of the presented information. Historical data for each product may be archived to enable the creation of history graphs for any product or class of products. For example, a graph illustrating the ratings of a product may be generated and shown as a rolling average of a predetermined time duration such as 14 days. The report requester may also be allowed to set various parameters for the historical data, such as the time duration the data should reflect. For instance, the time duration may be set from 1 to 365 days.

Further, additional features and functions may also be provided in the rating system 10 in accordance with various embodiments of the present invention. For instance, the price offset module 24 may be further adapted to calculate a correlation reliability value to ensure that the ratings of the products by the rating system 10 corresponds to reality in the marketplace. For example, a correlation reliability value may be indicative of correlation between a product attribute and price offset apportioned to the product attribute. Alternatively, or in addition thereto, the correlation reliability value may be, for example, a Cronbach alpha reliability value that is indicative of the correlation among the competitive indexes of the products for the attributes. If the Cronbach alpha reliability value tended to correlate among the competitive indexes of the products, the correlation is strong and the rating will correspondingly be reliable. Cronbach alpha reliability value can be used to measure correlation due to the fact that manufacturers tend to upgrade various features of their products in tandem with one another. For instance, in the example of digital cameras, manufacturers generally will not offer a digital camera with a large 6 megapixels resolution and a limited 2× zoom. When competitive indexes tend to rise and fall together over various products in the product category, the reliability of the correlation is confirmed and the ratings will correspondingly be reliable. Of course, other types of correlation reliability values may be used in other embodiments. The details of calculating correlation reliability values such as Cronbach alpha reliability values are known in the art and thus, are omitted herein.

If the correlation is found to be below a predetermined level, the price offset module 24 may be further adapted to disregard the product attribute in determining the competitive index. When the competitive index of a particular attribute changes erratically when compared to the other attributes of a product category, for example, the competitive index is often high when others are low and vice versa, the Cronbach alpha reliability value is lowered. The lowering of the Cronbach alpha reliability value indicates that the correlation is weak. Again, such product attributes that are found to have a correlation below a predetermined level may be disregard by the price offset module 24.

Moreover, the price offset module 24 may also be adapted to generate a warning such as an e-mail warning, if the correlation is less than a predetermined level. In certain cases, a low item correlation for a particular product attribute may be tolerated if the attribute is very important and does not effect the overall accuracy of the ratings. For example, as applied to digital cameras, the attribute of optical zoom is very important and thus, would preferably not be discarded. In this regard, a Boolean flag may be set for each attribute to allow determination of whether it is to be included in the calculation of the value index or not, thereby allowing exclusion of a particular attribute. Whenever an attribute is excluded, either manually or automatically, notifications such as an e-mail may be automatically generated by the rating system 10 to administrators and other interested users.

In accordance with the illustrated embodiment, the rating system 10 may also optionally be provided with a threshold module 28 that assigns an importance level to the attributes, and sets a corresponding threshold to the importance level which sets a maximum number of attributes that can be absent from a product at the particular importance level for the product to be used in determining the incremental competitive index by the indexing module 20. Thresholds may be expressed as "importance: number of attributes missing". For example, "0.90:0" would mean that a product cannot be missing any attributes of importance≧90. In a similar manner, "0.80:1" would mean the product can be missing at most one attribute with importance≧80, and "0.70:2" would mean the product can be missing no more than two attributes of importance≧70, in order to satisfy having an "essential" combination of attributes. This ability to set importance levels and thresholds to attributes is useful in situations where product information gathered by the identification module 16 of the rating system 10 is incomplete with respect to one or more attributes for one or more products. This may occur due to the fact that different manufacturers do not publish identical specifications regarding their products. Thus, this feature can be readily used to ensure integrity of the competitive index, the value index, and the ratings derived from such specifications.

In the above regard, products that do not have a particular attribute information may still be rated by the rating system 10 by assigning 0.50 competitive index as a default value with respect to the particular attribute of the product. This allows rating of products for which information gathered by the identification module 16 is incomplete for some reason. As can be appreciated, by incorporating the above feature of importance levels and thresholds, the rating system 10 may be operated to absolutely require very important attributes to be present before being rated. For instance, with respect to digital cameras, information regarding resolution is very important and thus, the corresponding importance level and threshold are set so that resolution information must be present for the product to be ranked.

Furthermore, additional factors may also optionally be considered during the process of ranking the plural products of a product category by the ranking system 10. These additional factors may include user opinions, brand quality scores, brand affinity ratings, customer support levels, etc. In this regard, an optional provision may be made to encompass brand consideration in rating of products in a product category. This may be implemented by assigning a weight to each brand that have products ranked in the product category. A global brand weight may be used by default for every product category for that brand. However, this global brand weight may be optionally overridden for a particular product category. For instance, an electronics manufacturer may be given a global brand weight with respect to audio equipment, another brand weight for digital cameras, and yet another brand weight for computer equipment. The assignment of brand weight may be based on numerous factors such as reputation, reliability, warranty, customer support, etc.

Moreover, because the ranking system 10 in accordance with the illustrated embodiment is connected to a network 14, an optional provision may be made to allow manufacturers of rated products to alter one or more attribute of their products to see how such alterations affect the rating of the product. For example, a manufacturer of a digital camera may be allowed to alter attributes of memory size, number of pixels, price, etc. of their product(s) to see their impact on the product's rating. Of course, these hypothetical ratings are not for actual products, and hence, are not published for consumers to view.

Figure 2:
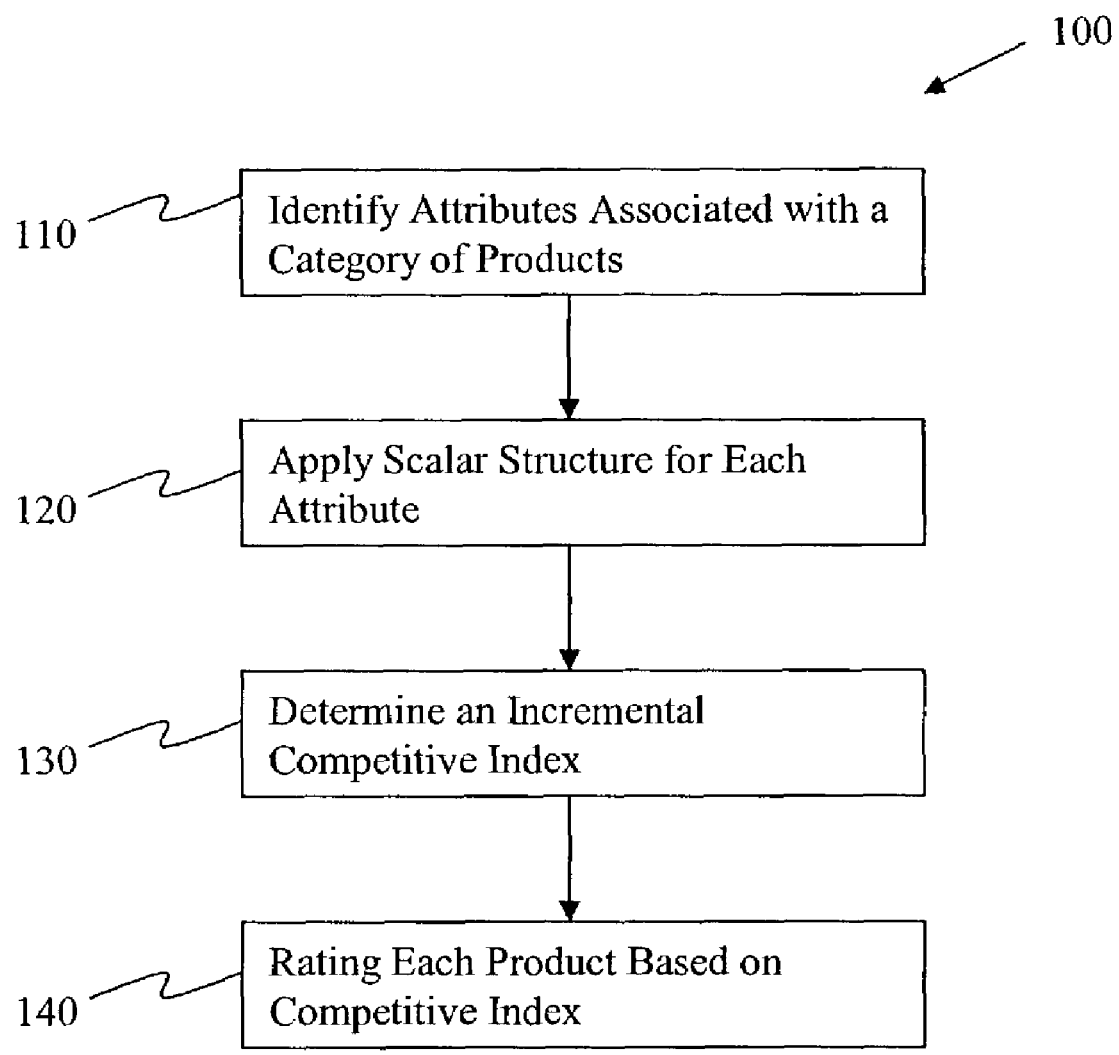
FIG. 2 is a flow chart of a method for rating plural products in accordance with one embodiment of the present invention.

It should now be evident from the discussion above that the present invention also provides a method for rating each of plural products as shown in the schematic diagram 100 of FIG. 2 that illustrates one embodiment of the method. As shown, the method includes step 110 where plurality of attributes associated with a category of product is identified. In step 120, a scalar structure is applied for each attribute to provide scalar value of each attribute for each of the plural products. In step 130, an incremental competitive index is determined for each attribute of each product based on the scalar value of each attribute applied in step 120 and the number of products having the scalar value. Each product is then rated in step 140 based on the competitive index determined in step 130.

Figure 3:
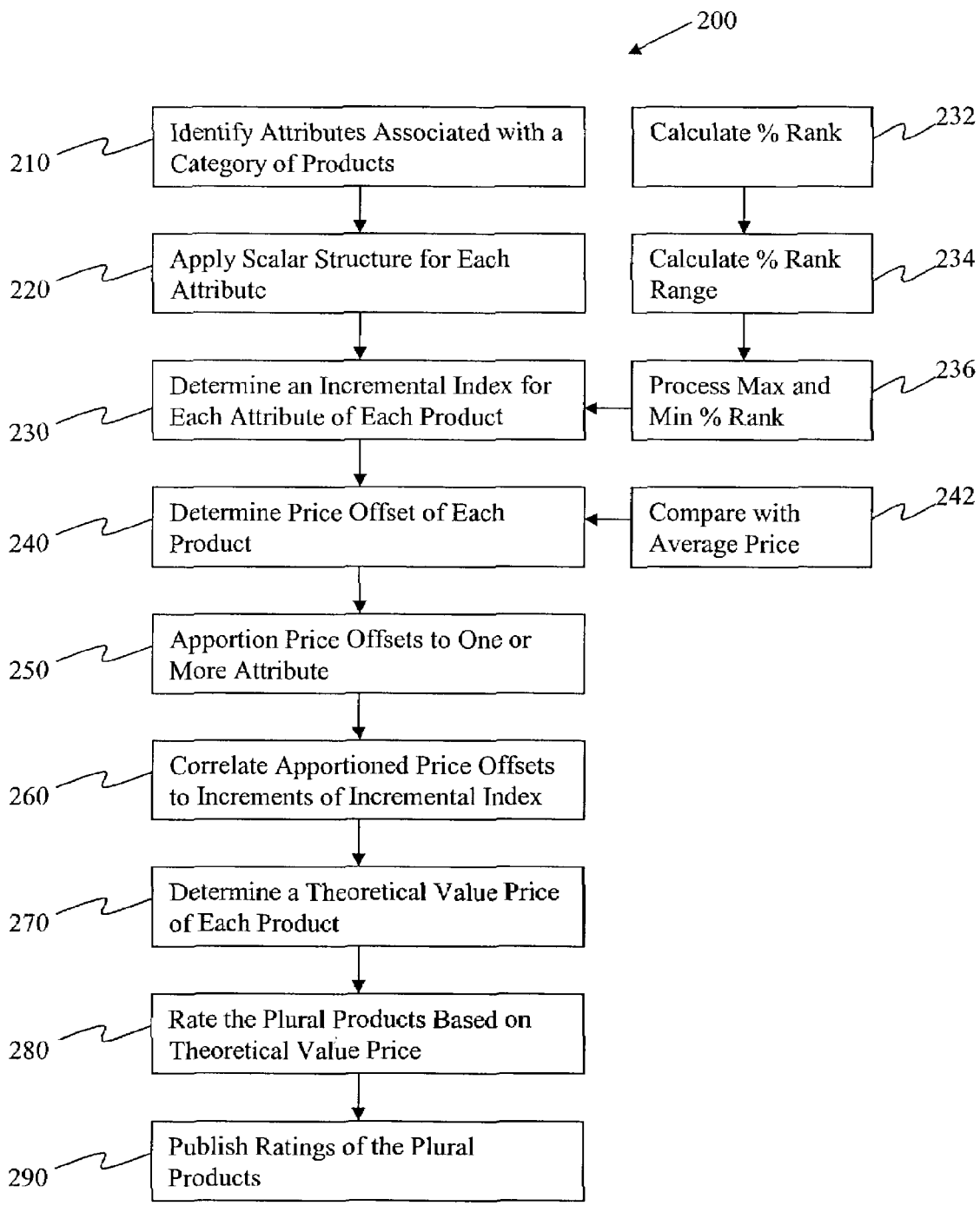
FIG. 3 is a flow chart of a method for rating plural products in accordance with another embodiment of the present invention.

In accordance with another embodiment, the present invention also provides another method for rating plural products as shown in the schematic diagram 200 of FIG. 3. In accordance with the method of FIG. 3, a plurality of attributes associated with a category of product are identified in step 210, the plurality of attributes preferably including price for each of the plural products. A scalar structure for each attribute is applied in step 220 to provide scalar value of each attribute for each of the plural products. In step 230, an incremental index is determined for each attribute of each product based on the scalar value of each attribute as applied in step 220. Preferably, the incremental index is a competitive index which is based on number of products having the scalar value. However, the incremental index may also be based on a percentile rank.

In accordance with the present method, a price offset of each product, which is based on an average price of the plural products in the category, is determined in step 240 and apportioned to one or more attribute associated with the product category in step 250. The apportioned price offsets are then correlated to increments of incremental index in step 260. A theoretical value price of each product is then determined in step 270 based on the correlated apportioned price offsets, for instance, by adding the price offsets of each attribute of each product to the average price of the products in the product category. In step 280, the plural products are then rated based on actual product price and the determined theoretical value price. The ratings of the plural products may then be published in step 290.

As can also be appreciated, additional steps may also be provided in the present method of FIG. 3. For instance, the step 230 for determining incremental index for each attribute may also include step 232 in which percentile rank of each scalar value is calculated, step 234 in which a percentile rank range which each scalar value spans is calculated, and step 236 in which a maximum percentile rank and a minimum percentile rank of the calculated percentile rank range are processed. In this regard, the step 236 may include averaging of the maximum percentile rank and the minimum percentile rank together and/or sequencing the scalar values of each attribute for the plural products.

Furthermore, additional optional steps may also be provided in accordance with various embodiments of the present method. For instance, in step 250, the apportionment of the price offset of each product to one or more attribute may be based on the determined incremental index of each attribute for each product. Importance levels with corresponding thresholds may be assigned to the attributes as described previously to set maximum number of attributes that can be absent from a product at the importance level for the product to be subjected to step 230 in which the incremental index is determined.

Moreover, a correlation reliability value may be calculated to ensure integrity of the ratings. The correlation reliability value may monitor correlation between a product attribute and price offset apportioned to the product attribute. Alternatively, Cronbach alpha reliability value or other correlation reliability value may be used. In this regard, a warning may be generated if the correlation is less than a predetermined level. Additionally, a notification may be generated if a rating of a product changes a predetermined amount.

Lastly, as previously noted, the present invention may be implemented using hardware and/or software. Therefore, it should also be apparent that another aspect of the present invention is a computer readable medium for rating plural products having instructions for identifying a plurality of attributes associated with a category of product, applying a scalar structure for each attribute to provide scalar value of each attribute for each of said plural products, determining a competitive index for each attribute of each product based on said scalar value of each attribute and a number of products having said scalar value, and rating each product based on said determined competitive indexes. In this regard, it should also be apparent that the computer readable medium may also be provided with additional instructions for implementing the method and system as more fully described above.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications as defined by the appended claims and legal equivalents.

We claim:

1. A method executed in a computer system having at least one physical computing device for rating of each of plural products comprising the steps of:

using a first physical computing device, identifying a plurality of attributes associated with a category of product;

using the first physical computing device, applying a scalar structure for each attribute to provide a scalar value of each attribute for each of said plural products;

using the first physical computing device or a second physical computing device or a combination of the first and the second physical computing devices, determining a competitive index of each scalar value for each attribute of each product based on said scalar value of each attribute and a number of products having said scalar value, wherein determining said competitive index comprises:

calculating a percentile rank of each scalar value;

calculating the percentile rank range which each scalar value spans; and determining an average of a maximum percentile rank and a minimum percentile rank of said calculated percentile rank range which each scalar value spans, said competitive index being determined to be said average; and rating each product on the first physical computing device or the second physical computing device or on the combination of the first and the second physical computing devices based on said determined competitive indexes.

2. The method of claim 1, wherein said plurality of attributes includes the price of each of said plural products.

3. The method of claim 2, further comprising the steps of determining a price offset of each product based on an average price of said plural products in said category, and apportioning said price offset of each product to one or more attributes associated with said category.

4. The method of claim 3, further comprising the step of correlating said apportioned price offsets to increments of said competitive index.

5. The method of claim 4, further comprising the steps of determining a theoretical value price of each product based on said correlated apportioned price offsets, and rating each of said plural products based on actual product price and said determined theoretical value price.

6. The method of claim 5, wherein determining said competitive index of each scalar value for each attribute further comprises the step of sequencing said scalar value of each attribute for each of said plural products.

7. The method of claim 3, further comprising the step of calculating a correlation reliability value indicative of a correlation between respective ones of the product attributes and the respective price offsets apportioned thereto.

8. The method of claim 7, further comprising the step of generating a warning if said correlation is less than a predetermined level and not generating the warning if said correlation is greater than or equal to said predetermined level.

9. The method of claim 7, further comprising the step of disregarding said product attribute in determining said competitive index if said correlation is less than a predetermined level and not disregarding said product attribute in determining said competitive index if said correlation is greater than or equal to said predetermined level.

10. The method of claim 1, further comprising the step of providing an anticipated street price for a new product when said new product does not have a price associated therewith from a predetermined number of vendors, and not providing said anticipated street price for said new product when said new product does have a price associated therewith from the predetermined number of vendors.

11. The method of claim 1, further comprising the steps of assigning an importance level to at least one attribute, and setting a corresponding threshold to said importance level which sets a maximum number of attributes that can be absent from a product at said importance level for said product to be subjected to said step of determining said competitive index.

12. The method of claim 1, further comprising the step of generating a notification if a rating of one of the products changes at least a predetermined amount and not generating said notification if said rating of said one of the products does not change at least said predetermined amount.

13. The method of claim 1, further comprising the step of publishing a rating of each of said plural products.

14. A computer system for rating each of plural products comprising:
a processor; and
a memory, communicatively coupled to the processor;
wherein the computer system is configured to perform a method, the method comprising:
storing a plurality of attributes associated with a category of product;
applying a scalar structure for each attribute to provide a scalar value of each attribute for each of said plural products;
determining a competitive index of each scalar value for each attribute of each product based on said scalar value of each attribute and a number of products having said scalar value, wherein determining said competitive index comprises:
calculating a percentile rank of each scalar value;
calculating the percentile rank range which each scalar value spans; and
determining an average of a maximum percentile rank and a minimum percentile rank of said calculated percentile rank range which each scalar value spans, said competitive index being determined to be said average; and
rating each product based on said determined competitive index.

15. The computer system of claim 14, wherein said plurality of attributes includes the price of each of said plural products.

16. The computer system of claim 15, wherein the method further comprises determining a price offset of each product based on an average price of said plural products in said category, and apportioning said price offset of each product to one or more of the plurality of attributes associated with said category of product.

17. The computer system of claim 16, wherein the method further comprises correlating said apportioned price offsets to increments of said competitive index.

18. The computer system of claim 17, wherein the method further comprises determining a theoretical value price of each product based on said correlated apportioned price offsets.

19. The computer system of claim 18, wherein the method further comprises rating each of said plural products based on actual product price and said determined theoretical value price.

20. The computer system of claim 19, wherein the method further comprises sequencing said scalar value of each attribute for each of said plural products.

21. The computer system of claim 17, wherein the method further comprises calculating a correlation reliability value indicative of a correlation between respective ones of the product attributes and the respective price offsets apportioned thereto.

22. The computer system of claim 21, wherein the method further comprises generating a warning if said correlation is less than a predetermined level and not generating the warning if said correlation is greater than or equal to said predetermined level.

23. The computer system of claim 21, wherein said computer system is configured to disregard said product attribute in determining said competitive index if said correlation is less than a predetermined level and not disregard said product attribute in determining said competitive index if said correlation is greater than or equal to said predetermined level.

24. The computer system of claim 14, wherein the method further comprises assigning an importance level to at least one attribute, and setting a corresponding threshold to said importance level which sets a maximum number of attributes that can be absent from a product at said importance level for said product to be subjected to said step of determining said competitive index.

25. The computer system of claim 14, wherein the method further comprises generating a notification if a rating of one of the products changes at least a predetermined amount and not generating said notification if said rating of said one of the products does not change at least said predetermined amount.

26. The computer system of claim 14, wherein said computer system is a server connected to a network.

27. The computer system of claim 26, wherein the method further comprises publishing a rating of each of said plural products such that said ratings are remotely accessible via said network.

28. A computer readable medium for rating plural products storing computer-executable instructions for causing a computer to execute a method comprising:
identifying a plurality of attributes associated with a category of product;
applying a scalar structure for each attribute to provide a scalar value of each attribute for each of said plural products;
determining a competitive index of each scalar value for each attribute of each product based on said scalar value of each attribute and a number of products having said scalar value of each attribute, wherein determining said competitive index comprises:
calculating a percentile rank of each scalar value;
calculating the percentile rank range which each scalar value spans; and determining an average of a maximum percentile rank and a minimum percentile rank of said calculated percentile rank range which each scalar value spans, said competitive index being determined to be said average; and rating each product based on said determined competitive indexes.

29. The medium of claim 28, wherein said plurality of attributes includes the price of each of said plural products.

30. The medium of claim 29, wherein the method further comprises determining a price offset of each product based on an average price of said plural products in said category, and apportioning said price offset of each product to one or more of the plurality of attributes associated with said category.

31. The medium of claim 30, wherein the method further comprises correlating said apportioned price offsets to increments of said competitive index.

32. The medium of claim 31, wherein the method further comprises determining a theoretical value price of each product based on said correlated apportioned price offsets, and rating each of said plural products based on actual product price and said determined theoretical value price.

33. The medium of claim 32, wherein determining the competitive index of each scalar value for each attribute of each product further comprises sequencing said scalar value of each attribute for each of said plural products.

34. The medium of claim 30, wherein the method further comprises calculating a correlation reliability value indicative of a correlation between respective ones of the product attributes and the respective price offsets apportioned thereto.

35. The medium of claim 34, wherein the method further comprises generating a warning if said correlation is less than a predetermined level and not generating the warning if said correlation is greater than or equal to said predetermined level.

36. The medium of claim 34, wherein the method further comprises disregarding said product attribute in determining said competitive index if said correlation is less than a predetermined level and not disregarding said product attribute in determining said competitive index if said correlation is greater than or equal to said predetermined level.

37. The medium of claim 28, wherein the method further comprises allowing assignment of an importance level to at least one attribute, and setting a corresponding threshold to said importance level which sets a maximum number of attributes that can be absent from a product at said importance level for said product to be subjected to said step of determining said competitive index.

38. The medium of claim 28, wherein the method further comprises generating a notification if a rating of one of the products changes at least a predetermined amount and not generating said notification if said rating of said one of the products does not change at least said predetermined amount.

39. The medium of claim 28, wherein the method further comprises publishing rating of each of said plural products.

* * * * *

UNITED STATES PATENT AND TRADEMARK OFFICE
CERTIFICATE OF CORRECTION

PATENT NO. : 7,627,486 B2  Page 1 of 1
APPLICATION NO. : 10/265189
DATED : December 1, 2009
INVENTOR(S) : Musgrove et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2088 days.

Signed and Sealed this

Second Day of November, 2010

David J. Kappos
*Director of the United States Patent and Trademark Office*